(12) United States Patent
Palaez et al.

(10) Patent No.: US 7,126,938 B2
(45) Date of Patent: Oct. 24, 2006

(54) INTERNET PROTOCOL ENABLED MULTIMEDIA MAIL SYSTEM WITH REDUCED BANDWIDTH REQUIREMENTS

(75) Inventors: Mariana Benitez Palaez, Naperville, IL (US); Anne Yin-Fee Lee, Naperville, IL (US); Stinson Samuel Mathai, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 924 days.

(21) Appl. No.: 10/068,018

(22) Filed: Feb. 5, 2002

(65) Prior Publication Data

US 2003/0147373 A1 Aug. 7, 2003

(51) Int. Cl.
*H04L 12/28* (2006.01)
*H04L 12/66* (2006.01)
*H04L 12/50* (2006.01)

(52) U.S. Cl. .................................. 370/351; 370/352
(58) Field of Classification Search ................ 370/351, 370/352, 276, 468, 477, 265, 260, 232–235, 370/395–397, 338, 473, 349; 709/204, 231, 709/265, 232; 379/88.17, 67.1, 88.12, 100.15; 455/412, 413, 415, 417; 386/45, 125; 707/10; 348/14.09
See application file for complete search history.

(56) References Cited

U.S. PATENT DOCUMENTS

| | | | | |
|---|---|---|---|---|
| 5,768,347 A | * | 6/1998 | Beyda | ........................ 379/67.1 |
| 6,009,082 A | * | 12/1999 | Caswell et al. | ............. 370/276 |
| 6,282,269 B1 | * | 8/2001 | Bowater et al. | ......... 379/88.17 |
| 6,826,173 B1 | * | 11/2004 | Kung et al. | .................. 370/352 |
| 2002/0049852 A1 | * | 4/2002 | Lee et al. | .................... 709/231 |
| 2003/0068154 A1 | * | 4/2003 | Zylka | ........................... 386/46 |

* cited by examiner

*Primary Examiner*—Chi Pham
*Assistant Examiner*—Prenell Jones

(57) ABSTRACT

In a multimedia communications system (100), a multimedia-based answering system (200) lowers the amount of air interface bandwidth used to send multimedia mail messages. When a called party is unavailable, a user of a user terminal (102) is given an option to send a multimedia mail message for the unavailable called party (300, 302, 304). If the user wants to send a multimedia mail message, the bandwidth requirements for the call are renegotiated to reduce bandwidth for sending the multimedia mail message (306). The multimedia mail message is then transmitted over-the-air to a multimedia mail system (208), where the multimedia mail message is buffered, transcoded (if necessary) and stored until the called party retrieves it (308, 310).

12 Claims, 2 Drawing Sheets

INTERNET PROTOCOL ENABLED MULTIMEDIA MAIL SYSTEM WITH REDUCED BANDWIDTH REQUIREMENTS

FIELD OF THE INVENTION

The present invention relates generally to multimedia communications system, and in particular, to a method and system for lowering the amount of air interface bandwidth used to send multimedia mail messages to a multimedia mail system.

BACKGROUND OF THE INVENTION

Wireless communication systems are well known. Wireless communication systems allow mobile radiotelephones to communicate with each other and other networks, such as the Internet and the public telephone network. First and second generation wireless telephone systems are generally constrained in the amount of bandwidth available for communication. This limits capacity and also the types of services that are provided. Third generation wireless systems hold the promise of greater bandwidth, thereby increasing capacity and allowing for enhanced services, such as multimedia services. Third generation wireless communications devices include, in addition to a voice communication interface, capability for communication of data and display of data, including video.

Voicemail systems are also known. Voicemail systems allow callers the option to leave voicemail messages for parties who are unavailable. In order to leave a message, the caller is typically prompted to enter a command on a keypad of a handset or wait for a specified tone, or both. The voicemail system then records the voicemail message for a predetermined amount of time or until the caller ends the call. Proposed third generation wireless systems will permit wireless users the capability to leave messages in multimedia mail systems similar to that of voicemail systems. However, voicemail systems presently function as real-time entities that use the same amount of air interface bandwidth for recording voice messages as for regular telephone calls. This is a problem.

Therefore a need exists for a method and system for lowering the amount of air interface bandwidth used to send multimedia mail messages to a multimedia mail system.

SUMMARY OF THE INVENTION

In accordance with one aspect of the present invention a method is provided for storing multimedia mail messages to save air interface bandwidth. The method begins with a first device initiating a call to a second device. Preferably, the first and second devices are each a wireless telephone, a computer or a personal digital assistant. Then, a determination is made as to whether a user of the second device is available. If it is determined that the user of the second device is not available, a user of the first device is provided with an option to send a multimedia mail message. Preferably, the option to send a multimedia mail message is displayed to the user of the first device in an HTML (HyperText Markup Language) menu that is included with a SIP (Session Initiation Protocol) INVITE message. If the user chooses to send a multimedia mail message, a change is made to the bandwidth requirements for the multimedia mail message. Preferably, the bandwidth requirements are reduced, for example, by specifying a "best efforts" transfer mode. After the bandwidth requirements are changed, the multimedia mail message is transmitted over-the-air to a multimedia storage system, where the multimedia mail message is stored until the user of the second device retrieves it. Preferably, the user of the second device retrieves the message by streaming or downloading.

A multimedia-based answering system resides in or is coupled to a multimedia communications system. The multimedia-based answering system receives and stores multimedia mail messages. The multimedia-based answering system includes input processing and storage for receiving the multimedia mail message in a non-real-time mode (due to bandwidth reduction); a transcoder for coding the multimedia mail message into a format for storage; and a multimedia storage system for storing the coded multimedia mail message.

DETAILED DESCRIPTION OF THE PREFERRED EMBODIMENTS

Figure 1:
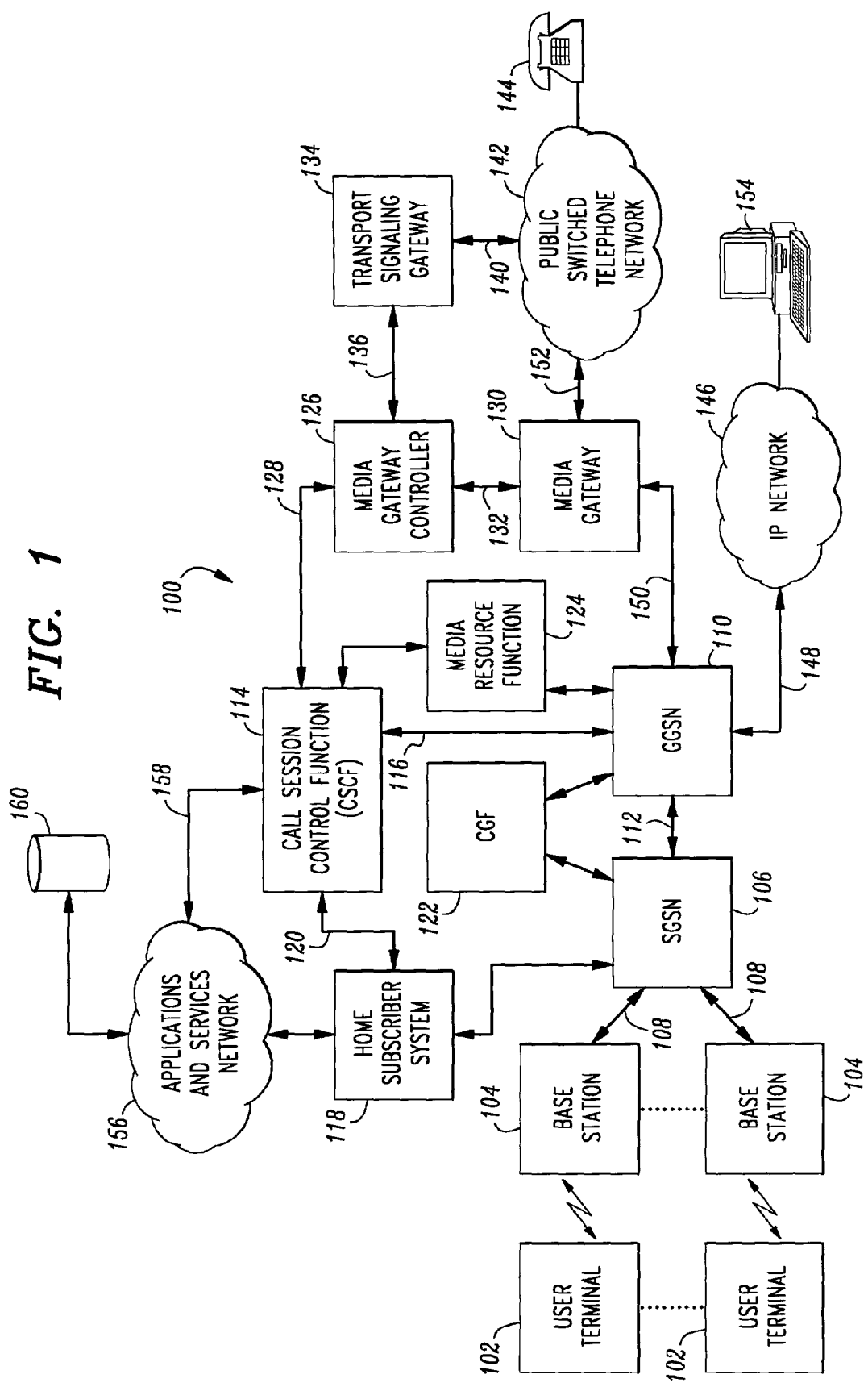
FIG. 1 is a block diagram of a multimedia communications system in accordance with the present invention.

FIG. 1 is a block diagram of a preferred embodiment of a multimedia communications system 100 in accordance with the present invention. Users interact with multimedia communications system 100 via user equipment or user terminals 102. Multimedia communications system 100 includes a third generation wireless system, as defined by the $3^{rd}$ Generation Partnership Project, also known as 3GPP (see 3gpp.org). User terminal 102 is typically a mobile device that includes a user interface and an interface for coupling to communications system 100. The user interface of user terminal 102 is typically referred to as terminal equipment and generally includes an audio interface, such as a microphone and speakers, a visual interface, such as a display, and a user input interface, such as a keyboard or touch pad. The interface for coupling to communications system 100 is typically referred to as a mobile terminal and generally includes an over-the-air interface for transmitting and receiving data.

The over-the-air interface of user terminal 102 is used to communicate with base stations 104. In the preferred embodiment, base stations 104 include an over-the-air interface that is complementary to the over-the-air interface of user terminal 102. Most preferably, user terminal 102 and base stations 104 communicate over-the-air using a packet-based protocol.

Multimedia communications system 100 provides users with a variety of options for communication. Users are able to transmit and receive multimedia communications, including audio, voice, video, and all types of data. Multimedia communications system 100 provides access to data networks, such as the Internet, and public telephone networks, including wireless networks.

In the preferred embodiment, the multimedia communications that are directed to and received from users via base stations 104 are coordinated and transferred using a serving GPRS (GSM Packet Radio System) support node (SGSN) 106, a gateway GPRS support node (GGSN) 110, a call session control function (CSCF) 114 and a home subscriber system 118. SGSN 106 coordinates multimedia transmissions to and from base stations 104. SGSN 106 is coupled to GGSN 110 via a data link 112. GGSN 110 interfaces the multimedia communications to and from SGSN 106 to other networks. Call session control function 114 is coupled to GGSN 110 via a data link 116. Call session control function 114 coordinates and executes a signaling protocol used to establish, maintain and control calls or sessions for communications involving user terminals 102. A home subscriber system 118 is coupled to call session control function 114 via a data link 120. Home subscriber system 118 includes subscriber profile information, including information traditionally associated with a home location register for a mobile subscriber.

To facilitate ancillary and support functions within multimedia communications system 100, a charging gateway function (CGF) 122 and a media resource function 124 are provided. Charging gateway function 122 is coupled to SGSN 106 and GGSN 110 to account for packets passing through these elements for accounting, billing and other purposes. Media resource function 124 is coupled to call session control function 114 and to GGSN 110. Media resource function 124 provides resources for conference bridging, tones, announcements, text-to-speech conversion, automatic speech recognition and other service functions for communications through GGSN 110.

GGSN 110 couples user terminals 102 to other networks. In particular, GGSN 110 is coupled to an Internet protocol (IP) network 146 via a data link 148. Data link 148 preferably implements a packet-based protocol for transfers to a data network. Data link 148 and IP network 146 provide access to any elements connected to IP network 146, such as, for example, a computer 154. GGSN 110 is also coupled to a media gateway 130 via a data link 150. Media gateway 130 is in turn coupled to a public switched telephone network 142 via a communications link 152. Media gateway 130 converts packetized voice received from GGSN 110 to a circuit-switched protocol acceptable to the public switched telephone network 142. Conversely, media gateway 130 converts circuit-switched communications received from public switched telephone network 142 to packetized communications acceptable to the user terminal transported through the GGSN 110. Media gateway 130, data link 150, and communications link 152 provide an interface for user terminals 102 to the public switched telephone network 142. By virtue of this connection, user terminals 102 are coupled to elements attached to the public switched telephone network, such as telephone 144.

The signaling and control necessary to interface user terminal 102 via GGSN 110 with public switched telephone network 142 is controlled and provided by call session control function 110, a media gateway controller 126 and a transport signaling gateway 134. Media gateway controller 126 is coupled to call session control function 114 via a data link 128. Media gateway controller 126 is coupled to control media gateway 130 via data link 132. Call session control function 114 determines based on a signaling protocol any necessary media gateway resources needed for a particular communication or session. These needs are transmitted to media gateway controller 126, which in turns configures and establishes the necessary resources in media gateway 130 and also provides the necessary signaling to transport signaling gateway 134. The resources in media gateway 130 are configured to transfer the actual (bearer) data between the GGSN 110 and the public switched telephone network 142. Transport signaling gateway 134 converts the signaling protocol from the media gateway controller 136 to a signaling protocol necessary for public switched telephone network 142.

Applications and services are preferably coupled to multimedia communication system 100 for use in interaction with user terminals 102. In particular, call session control function 114 is coupled to an applications and services network 156 via a data link 158. Also, home subscriber system 118 is preferably coupled to application and services network 156. A myriad of services and applications may reside in or be coupled to application services network 156, including a multimedia-based answering system in accordance with the present invention.

In the preferred embodiment, SGSN 106, GGSN 110, CGF 122, media resource function 124, CSCF 114, media gateway controller 126, media gateway 130, and home subscriber system 118 are processor-based apparatus with data link interfaces for coupling together as described above and shown in FIG. 1. These apparatus include one or more processors that execute programs to implement the functionality described herein and generally associated with third generation wireless systems. The flexibility of these processor-based systems permits ready integration into these systems of a multimedia-based answering system in accordance with the present invention.

Figure 2:
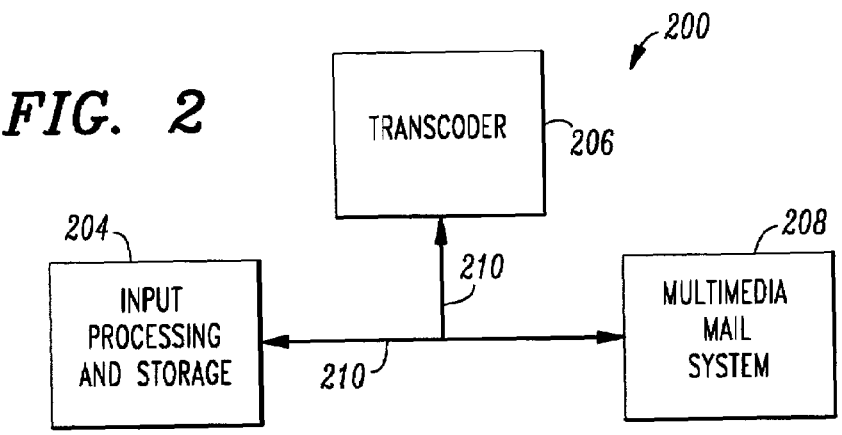
FIG. 2 is a block diagram of a preferred embodiment of a multimedia-based answering system in accordance with the present invention.

FIG. 2 is a block diagram of a multimedia-based answering system 200 in accordance with the present invention. Multimedia-based answering system 200 includes input processing and storage 204, transcoder 206 and multimedia storage system 208. Input processing and storage 204, transcoder 206 and multimedia storage system 208 are coupled via data links 210. Preferably, transcoder 206 is a remote resource that is coupled to multimedia-based answering system 200, when needed. Alternatively, transcoder 206 is co-located with multimedia-based answering system 200. Multimedia-based answering system 200 is coupled to or resides in multimedia communications system 100. In a preferred embodiment, multimedia-based answering system 200 resides in application and services network 156 and is coupled to CSCF 114 and home subscriber system 118. Alternatively, multimedia-based answering system 200 is incorporated and integrated into a processor-based apparatus associated with multimedia communications system 100.

Input processing and storage 204 is coupled to multimedia communications system 100 to receive a multimedia mail message in accordance with the present invention. Input processing and storage 204 receives the multimedia mail message, collects the data, rearranges the data in a sequential fashion (the data may not be received sequentially), and then provides the data to transcoder 206. Input processing and storage 204 is preferably implemented using a microprocessor, digital signal processor or combination of these with appropriate memory and programming to implement the identified functions. Notably, input processing and storage 204 does not require that the data it receives be received in real-time or something close to real-time. Hence, a bandwidth adjustment to receive data at a "best effort" data rate is acceptable.

Transcoder 206 is any audio, video or other encoder or decoder or transcoder necessary to convert a received message to a preferred storage format. Preferably, transcoder 206 is a standard transcoder that expects input data at approximately real-time and converts that input data into a format for storage by multimedia storage system 208. Input processing and storage 204 provides data to transcoder 206 in any manner and with the correct timing expected by transcoder 206.

Multimedia storage system 208 stores the output data from the transcoder for subsequent playback to a user. The format for storage varies. Preferably, the multimedia mail message is stored in a compressed format that is most acceptable to the multimedia storage system. Retrieval of the multimedia mail message may require transcoding to another format that is acceptable to the user device retrieving the message. The retrieval is alternatively in a streaming or downloaded format.

Figure 3:
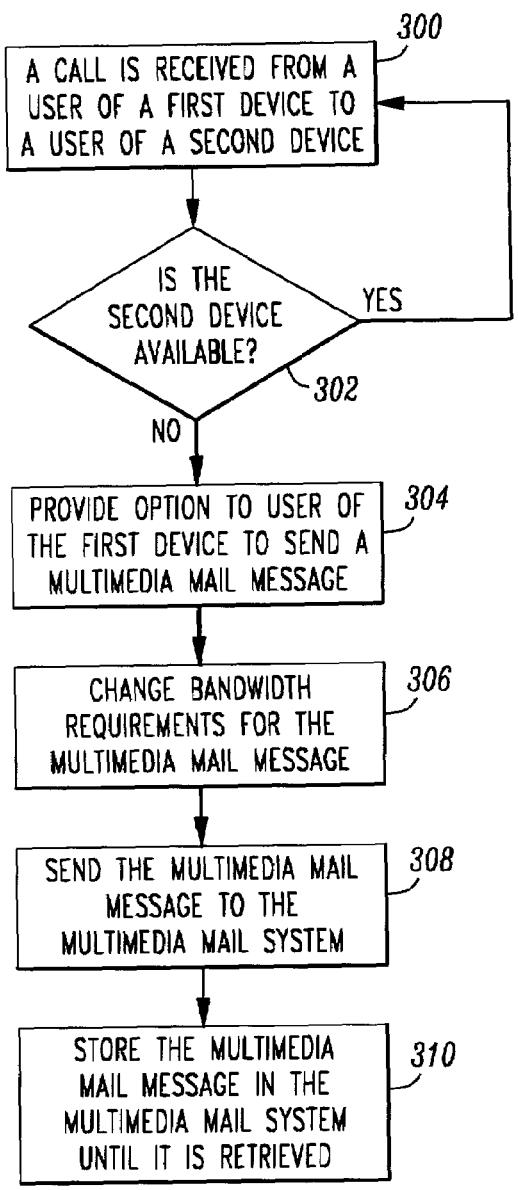
FIG. 3 is a flow diagram illustrating a method for storing a multimedia mail message in accordance with the present invention.

FIG. 3 is a flow chart illustrating a method for storing multimedia mail messages in accordance with the present invention. FIG. 3 is described below with reference to the preferred embodiments of FIG. 1 and FIG. 2. A call is received from a user of a first device to a user of a second device (300). A determination is made as to whether the user of the second device is available (302). This determination is made in a traditional manner by the second user's home network. If the user of the second device is not available, then the user of the first device is provided with an option to send a multimedia mail message (304). More specifically, in the preferred embodiment, the call session control function 114 in the second device's home network invokes the multimedia-based answering system 200. Then, the CSCF 114 or the multimedia-based answering system 200 sends an HTML menu, preferably as a part of a SIP INVITE message. The HTML menu provides the option to send a multimedia mail message.

If the user of the first device wants to send a multimedia mail message, the bandwidth requirements are changed for the call (306). In particular, if the call from the first device to the second device was the initially to be a real-time multimedia call, including video data, then the bandwidth requirements for the call initially may have been set for a real-time multimedia class quality of service, which requires substantial bandwidth in order to accommodate real-time transmission of video and/or voice data. However, in accordance with the invention, such a high quality of service is not necessary for the transmission of the multimedia mail message. In particular, the multimedia-based answering system 200 accommodates non-real-time transmission of multimedia data. Therefore, the changing of bandwidth requirements is typically a reduction in the amount of bandwidth required for the call. This may be accomplished by specifying a "best effort" quality of service for the transmission, such that the packet-based system will send data using less bandwidth. The negotiation of the change in bandwidth is accomplished by signaling possibly done by CSCF 114 and involving user terminal 102 and multimedia-based answering system 200.

After the bandwidth requirements and redirection of the message to the multimedia-based answering system 200 are established (306), the multimedia mail message is sent to the multimedia-based answering system (308). In particular, the first device preferably buffers and records the multimedia mail message, for example, using a camera, microphone, encoders and memory. Then the message is sent through multimedia communications system 100 to multimedia-based answering system 200. In particular, for a wireless device 102, the multimedia mail message is sent over the wireless interface to a base station 104. The multimedia mail message is then sent through various network devices to multimedia-based answering system 200. The multimedia mail message is preferably sent using a best effort quality of service and associated bandwidth, rather than a conversational quality of service bandwidth.

The multimedia mail message is stored in the multimedia-based answering system 200 for subsequent retrieval (310). In particular, the multimedia mail message is received by multimedia-based answering system 200 as a series of packets. The packets may not be sequentially received. Input processing and storage 204 receives the mail message as packets delivered over the communications system 100. The message is sequentially arranged by input processing and storage 204 and eventually sent to transcoder 206. Transcoder 206 receives the data, processes the data, and stores the data in multimedia storage system 208. The multimedia mail message is retrieved by the user by downloading or streaming after the appropriate communications are set up between the user's device and the multimedia-based answering system 200.

FIG. 3 describes the user of the first device being connected to the multimedia-based answering system 200 when the user of the second device is unavailable. There are alternatives for connecting the user of the first device to the multimedia-based answering system 200 in accordance with the present invention. The user of the first device is alternatively connected to the multimedia-based answering system 200 when the user of the first device dials direct to the answering system, when the user of the first device is disconnected from the user of the second device, or when the user of the second device forwards the call to the answering system. Then, the flow continues at step 304.

The present invention allows air interface bandwidth to be lowered when sending multimedia mail messages to a multimedia mail system. When a mobile user selects an option to send a multimedia mail message, the bandwidth requirements for the multimedia mail message are changed. The multimedia mail message is then sent to the multimedia mail system for storage until a called party retrieves the message. Advantageously, this invention helps to alleviate some load off the air interface bandwidth.

Whereas the present invention has been described with respect to specific embodiments thereof, it will be understood that various changes and modifications will be suggested to one skilled in the art and it is intended that the invention encompass such changes and modifications as fall within the scope of the appended claims.

The invention claimed is:

1. A method for storing messages in a multimedia mail system to save air interface bandwidth, the method comprising the steps of:

receiving a call from a first user of a first device to a second user of a second device;

making a determination as to whether the second user is available;

providing the first user with an option to send a multimedia mail message if the second user is not available;

changing bandwidth requirements for the call if the first user elects to send a multimedia mail message;

sending the multimedia mail message to the multimedia mail system; and storing the multimedia mail message in the multimedia mail system until the multimedia mail message is retrieved by the second user.

2. The method of claim 1 wherein the first device is one of a wireless telephone, a computer and a personal digital assistant.

3. The method of claim 1 wherein the second device is one of a wireless telephone, a computer and a personal digital assistant.

4. The method of claim 1 wherein the second user retrieves the multimedia mail message from the multimedia mail system by one of streaming and downloading.

5. The method of claim 1 wherein the option to send a multimedia mail message is provided to the first user in an HTML (HyperText Markup Language) menu.

6. The method of claim 1 wherein prior to the step of storing, the method comprises the steps of:
 recording the multimedia mail message with a camera coupled to the first device.

7. In a wireless system that couples users of wireless devices for voice and multimedia communications over-the-air, a multimedia-based answering system for lowering the amount of air interface bandwidth used to send multimedia mail messages comprising:
 a processor-based apparatus that:
  provides a first user of a first device with an option to send a multimedia mail message when a second user of a second device is not available; and
  changes bandwidth requirements for the call if the first user elects to send a multimedia mail message; and
 a multimedia mail system that:
  stores the multimedia mail message until the multimedia mail message is retrieved by the second user.

8. The multimedia-based answering system of claim 7 wherein the first device is one of a wireless telephone, a computer and a personal digital assistant.

9. The multimedia-based answering system of claim 7 wherein the second device is one of a wireless telephone, a computer and a personal digital assistant.

10. The multimedia-based answering system of claim 7 wherein the first device records the multimedia mail message with a camera that is coupled to the first device.

11. The multimedia-based answering system of claim 7 wherein the second user retrieves the multimedia mail message by one of streaming and downloading.

12. The multimedia-based answering system of claim 7 wherein the option to send a multimedia mail message is provided to the user of the first device in an HTML (HyperText Markup Language) menu.

* * * * *